US011913152B2

(12) United States Patent
Yamashita

(10) Patent No.: US 11,913,152 B2
(45) Date of Patent: Feb. 27, 2024

(54) LIQUID DISCHARGE APPARATUS, DYEING APPARATUS, EMBROIDERY MACHINE, AND MAINTENANCE DEVICE

(71) Applicant: Hiroyuki Yamashita, Kanagawa (JP)

(72) Inventor: Hiroyuki Yamashita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 375 days.

(21) Appl. No.: 17/417,379

(22) PCT Filed: Dec. 3, 2019

(86) PCT No.: PCT/JP2019/047262
§ 371 (c)(1),
(2) Date: Jun. 23, 2021

(87) PCT Pub. No.: WO2020/137383
PCT Pub. Date: Jul. 2, 2020

(65) Prior Publication Data

US 2022/0074098 A1 Mar. 10, 2022

(30) Foreign Application Priority Data

Dec. 28, 2018 (JP) ................................ 2018-248020
Oct. 24, 2019 (JP) ................................ 2019-193131

(51) Int. Cl.
*D05C 11/24* (2006.01)
*B41J 2/165* (2006.01)
(Continued)

(52) U.S. Cl.
CPC ........... *D05C 11/24* (2013.01); *B41J 2/16508* (2013.01); *B41J 2/16523* (2013.01);
(Continued)

(58) Field of Classification Search
CPC .. D05C 11/24; D05C 5/02; D06P 7/00; D06P 5/30; B41J 3/4078; B41J 2/165;
(Continued)

(56) References Cited

U.S. PATENT DOCUMENTS 4,465,005 A * 8/1984 Eguchi .............. D06B 11/0026 112/270
4,875,348 A * 10/1989 Kinnebrew, II ........ D05B 67/00 112/270
(Continued)

FOREIGN PATENT DOCUMENTS

CN 101087690 A 12/2007
CN 101229717 A 7/2008
(Continued)

OTHER PUBLICATIONS

International Search Report dated Feb. 27, 2020 in PCT/JP2019/047262 filed on Dec. 3, 2019, 12 pages.
(Continued)

*Primary Examiner* — Danny Worrell
(74) *Attorney, Agent, or Firm* — XSENSUS LLP

(57) ABSTRACT

A liquid discharge apparatus includes heads to discharge a liquid; caps to contact and move away from the plurality of heads, respectively; individual drain passages communicating with the plurality of caps, respectively; at least one common drain passage communicating with at least two of the individual drain passages; suction devices provided in the individual drain passages, respectively; and a controller. Each of the individual drain passages is to allow and shut off communication between the cap and the common drain passage. The controller causes the individual drain passage to allow the communication between the cap and the common drain passage when performing capping and decapping of the head. The controller caps the sucking target with the cap after shutting off each individual drain passage commu-
(Continued)

nicating with the cap corresponding to the head that is not a sucking target.

10 Claims, 16 Drawing Sheets

(51) Int. Cl.
*B41J 3/407* (2006.01)
*D06P 5/30* (2006.01)

(52) U.S. Cl.
CPC ......... *B41J 2/16532* (2013.01); *B41J 3/4076* (2013.01); *D06P 5/30* (2013.01)

(58) Field of Classification Search
CPC .......... B41J 2/16523; B41J 2002/16573; B41J 2002/16579
See application file for complete search history.

(56) References Cited

U.S. PATENT DOCUMENTS

| | | | | |
|---|---|---|---|---|
| 4,886,515 | A * | 12/1989 | Kinnebrew, II | D05B 67/00 8/151.2 |
| 5,992,963 | A | 11/1999 | Miyake et al. | |
| 6,189,989 | B1 * | 2/2001 | Hirabayashi | D06P 5/30 427/288 |
| 8,783,583 | B2 | 7/2014 | Drury et al. | |
| 9,868,286 | B2 | 1/2018 | Igarashi | |
| 10,525,734 | B1 * | 1/2020 | Jackson | B41J 11/00214 |
| 10,982,384 | B2 * | 4/2021 | Mor | D06B 3/045 |
| 11,186,929 | B2 * | 11/2021 | Jackson | D06P 5/30 |
| 11,584,124 | B2 * | 2/2023 | Yamaguchi | D06B 11/0023 |
| 2008/0136864 | A1 | 6/2008 | Nakamura et al. | |
| 2008/0174631 | A1 | 7/2008 | Habashi | |
| 2009/0241819 | A1 * | 10/2009 | Tseng | B41J 3/4078 112/470.05 |
| 2011/0254896 | A1 * | 10/2011 | Ferrarotti | B41J 3/4078 29/890.1 |
| 2012/0133707 | A1 | 5/2012 | Kikkawa et al. | |
| 2012/0320118 | A1 * | 12/2012 | Yokomaku | B41J 2/04581 347/11 |
| 2013/0100205 | A1 | 4/2013 | Sunouchi et al. | |
| 2015/0266307 | A1 | 9/2015 | Yokozawa | |
| 2017/0225470 | A1 | 8/2017 | Goto | |
| 2020/0139727 | A1 * | 5/2020 | Jackson | B41M 3/144 |
| 2020/0171842 | A1 * | 6/2020 | Ishihara | F21V 7/0058 |
| 2020/0207087 | A1 * | 7/2020 | Tanaka | D06P 5/30 |
| 2020/0207117 | A1 * | 7/2020 | Ikegami | B41J 2/04581 |
| 2020/0208317 | A1 * | 7/2020 | Sunaoshi | B41J 19/04 |
| 2021/0162737 | A1 * | 6/2021 | Miura | B41J 3/407 |
| 2021/0197557 | A1 * | 7/2021 | Yamaguchi | B41J 2/04573 |
| 2022/0034010 | A1 * | 2/2022 | Eklind | D05B 67/00 |
| 2022/0042242 | A1 * | 2/2022 | Eklind | D05C 11/24 |
| 2022/0048288 | A1 * | 2/2022 | Eklind | B41J 2/16517 |
| 2022/0056626 | A1 * | 2/2022 | Eklind | D04B 37/00 |
| 2022/0074098 | A1 * | 3/2022 | Yamashita | B41J 2/16523 |
| 2022/0098776 | A1 * | 3/2022 | Yamashita | D05C 11/24 |
| 2022/0098777 | A1 * | 3/2022 | Sunaoshi | D05C 11/24 |
| 2022/0098778 | A1 * | 3/2022 | Tanaka | D06P 1/0004 |
| 2022/0106720 | A1 * | 4/2022 | Gotoh | D05B 67/00 |
| 2022/0307181 | A1 * | 9/2022 | Konishi | D06B 11/0023 |

FOREIGN PATENT DOCUMENTS

| | | | |
|---|---|---|---|
| CN | 103057273 | A | 4/2013 |
| CN | 104924758 | A | 9/2015 |
| CN | 207955022 | U | 10/2018 |
| JP | 8-305129 | | 11/1994 |
| JP | 10-166566 | | 6/1998 |
| JP | 2001-063094 | A | 3/2001 |
| JP | 2004-098612 | | 4/2004 |
| JP | 2004-106333 | | 4/2004 |
| JP | 2006-225216 | | 8/2005 |
| JP | 2006-96017 | A | 4/2006 |
| JP | 2007-090554 | | 4/2007 |
| JP | 2007-160793 | | 6/2007 |
| JP | 2007-268722 | | 10/2007 |
| JP | 2008-179056 | A | 8/2008 |
| JP | 2009-285868 | | 12/2009 |
| JP | 2010-120266 | | 6/2010 |
| JP | 2010-283847 | A | 12/2010 |
| JP | 2012-513817 | A | 6/2012 |
| JP | 2013-099887 | | 5/2013 |
| JP | 2018-069527 | | 6/2018 |
| JP | 2018-149761 | A | 9/2018 |

OTHER PUBLICATIONS

CS&E—Upload peer contribution by CNIPA on Feb. 14, 2020, in PCT/JP2019/047262 filed on Dec. 3, 2019 , 11 pages.
CS&E—Upload peer contribution by JPO on Feb. 17, 2020, in PCT/JP2019/047262 filed on Dec. 3, 2019 , 10 pages.
CS&E—Upload peer contribution by KIPO on Feb. 18, 2020. in PCT/JP2019/047262 filed on Dec. 3, 2019 , 18 pages.
CS&E—Upload peer contribution by USPTO on Feb. 7, 2020. in PCT/JP2019/047262 filed on Dec. 3, 2019 , 8 pages.
Office Action dated Mar. 31, 2022 in Chinese Patent Application No. 201980085652.0, 8 pages.
Office Action dated Apr. 25, 2023 in Japanese Patent Application No. 2019-193131, 11 pages.
Japanese Office Action dated Jun. 13, 2023, in corresponding Japanese Patent Application No. 2019-193131, 11pp.

* cited by examiner

LIQUID DISCHARGE APPARATUS, DYEING APPARATUS, EMBROIDERY MACHINE, AND MAINTENANCE DEVICE

CROSS-REFERENCE TO RELATED APPLICATIONS

The present application is based on PCT filing PCT/JP2019/047262, filed Dec. 3, 2019, which claims priority to JP 2018-248020, filed Dec. 28, 2018 and JP 2019-193131, filed Oct. 24, 2019, the entire contents of each are incorporated herein by reference.

TECHNICAL FIELD

The present disclosure relates to a liquid discharge apparatus a dyeing apparatus, an embroidery machine, and a maintenance device.

BACKGROUND ART

An apparatus including a head to discharge a liquid (a liquid discharge head) is provided with a maintenance device (a maintenance-and-recovery unit) to perform maintain and recover a state of the head (a maintenance operation). For example, the maintenance device includes a cap to cover a nozzle face of the head and a suction device coupled to the cap.

A conventionally known maintenance device includes a plurality of caps respectively provided to a plurality of heads, a plurality of drain passages respectively connected to the caps, a plurality of suction pumps respectively provided to the drain passages, and a plurality of air release valves each of which is disposed between the cap and the suction pump. Each drain passage is coupled to an individual waste ink tank (for example, PTL 1).

CITATION LIST

Patent Literature

PTL 1: Japanese Unexamined Patent Application Publication No. 2004-098612

SUMMARY OF INVENTION

Technical Problem

In a structure in which each of the plurality of heads is provided with a cap and a suction device, when the plurality of drain passages are respectively coupled to a waste liquid container, the size of the maintenance device increases.

In view of the foregoing, an aim of the present disclosure is to make the maintenance unit compact.

Solution to Problem

In order to achieve the above-described object, there is provided a liquid discharge apparatus as described in appended claims. Advantageous embodiments are defined by the dependent claims.

Advantageously, the liquid discharge apparatus includes a plurality of heads to discharge a liquid; plurality of caps to contact and move away from the plurality of heads, respectively; a plurality of individual drain passages communicating with the plurality of caps, respectively; at least one common drain passage communicating with at least two of the plurality of individual drain passages; a plurality of suction devices provided in the plurality of individual drain passages, respectively; and a controller. Each of the individual drain passages is to allow and shut off communication between the cap and the common drain passage. The controller causes the individual drain passage to allow the communication between the cap and the common drain passage when performing capping and decapping of the head. The controller caps the sucking target with the cap after shutting off each individual drain passage communicating with the cap corresponding to the head that is not a sucking target.

Advantageously, a dyeing apparatus includes the plurality of heads, a conveyor configured to convey a medium to which the liquid is applied, a drier configured to dry the medium to which the liquid is applied, a post-treatment device configured to perform a post-treatment of the medium to which the liquid is applied, a winder configured to wind the medium, the plurality of caps, the plurality of individual drain passages, the common drain passage, and the plurality of suction devices. The dyeing apparatus includes a controller configured to cause each of the plurality of individual drain passages to allow the communication between the cap and the at least one common drain passage when performing capping and decapping of the head. Advantageously, an embroidery machine includes the plurality of heads, the conveyor, the drier, the post-treatment device, an embroidery device configured to perform embroidery with the medium treated by the post-treatment device, the plurality of caps, the plurality of individual drain passages, the common drain passage, and the plurality of suction devices. The embroidery machine includes the controller configured to cause each of the plurality of individual drain passages to allow the communication between the cap and the at least one common drain passage when performing capping and decapping of the head.

Advantageously, a maintenance device includes the plurality of caps, the plurality of individual drain passages, the common drain passage, and the plurality of suction devices. The maintenance device includes the controller configured to cause each of the plurality of individual drain passages to allow the communication between the cap and the at least one common drain passage when performing capping and decapping of the head, and shut cap the sucking target with the cap after shutting off each individual drain passage communicating with the cap corresponding to the head that is not a sucking target.

Advantageous Effects of Invention

Accordingly, downsizing can be achieved.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
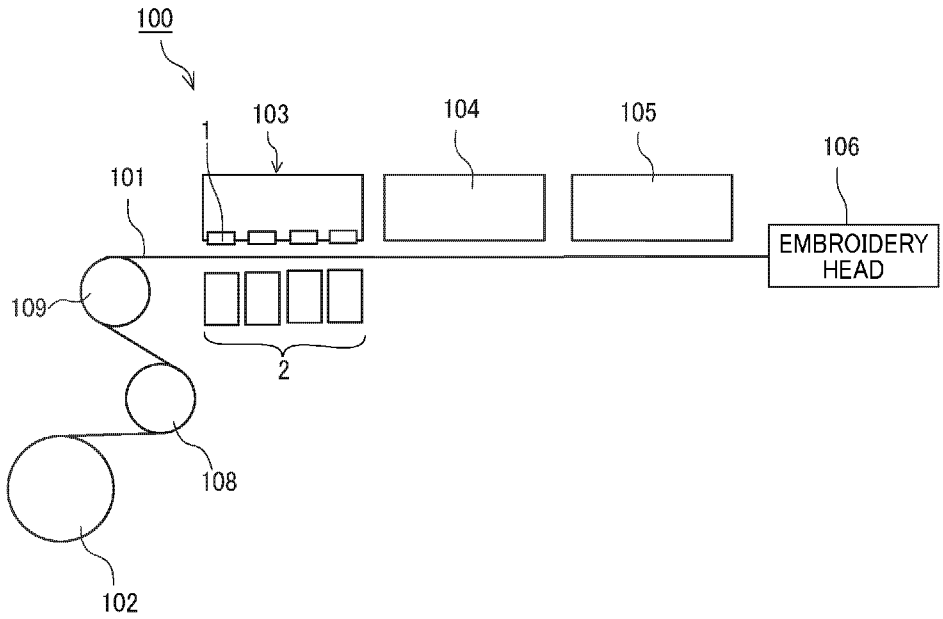
FIG. 1 is a schematic side view of a liquid discharge apparatus according to the present disclosure.

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, wherein like reference numerals designate identical or corresponding parts throughout the several views, exemplary embodiments of the present disclosure are described below.

Figure 2:
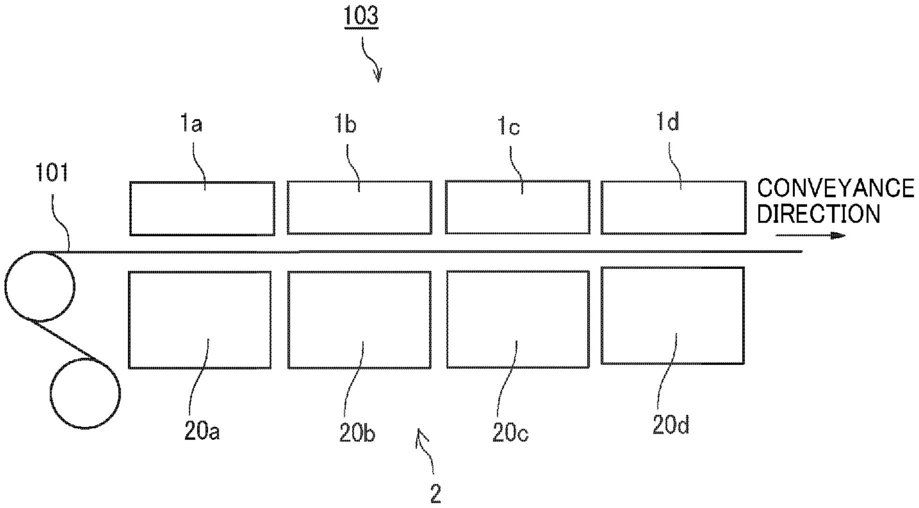
FIG. 2 is a schematic view of a liquid application unit (a liquid application device) of the liquid discharge apparatus illustrated in FIG. 1.
Figure 3:
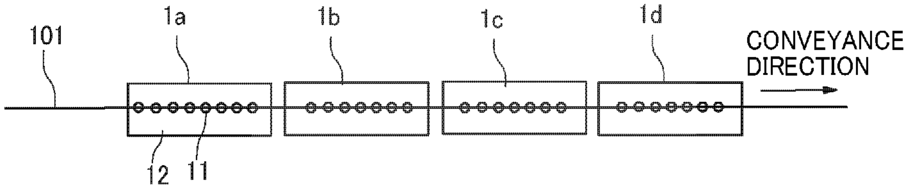
FIG. 3 is a plan view of a row of heads of the liquid application unit illustrated in FIG. 2, as viewed from below.

First, a liquid discharge apparatus according to an embodiment of the present disclosure is described with reference to FIGS. 1 to 3. FIG. 1 is a schematic view of a liquid discharge apparatus 100 according to the present embodiment. FIG. 2 is a view of a liquid application unit 103 of the liquid discharge apparatus 100. FIG. 3 is a view of a head row of the liquid application unit 103 as viewed from below.

The liquid discharge apparatus 100 is an in-line embroidery machine. The liquid discharge apparatus 100 includes a supply reel 102 on which a thread 101 is wound, the liquid application unit 103, a fixing unit 104, a post-treatment unit 105 (a post-treatment device), and an embroidery head 106 (an embroidery device). The thread 101 is a liquid application target to which a liquid is applied.

The thread 101 drawn from the supply reel 102 is guided by rollers 108 and 109 (conveyors) and continuously stretched to the embroidery head 106.

The liquid application unit 103 (a liquid discharge device) includes a plurality of heads 1 (la to 1*d*) and a maintenance unit 2. The liquid application unit 103 discharges a liquid of a required color onto the thread 101 which is drawn out from the supply reel 102. The maintenance unit 2 incudes a plurality of individual maintenance units 20 (20*a* to 20*d*) to perform maintenance of the heads 1, respectively. The heads 1*a* to 1*d* discharge, for example, cyan (C), magenta (M), yellow (Y), and black (K) color liquids.

As illustrated in FIG. 3, each of the heads 1 (la to 1*d*) includes a nozzle plate in which a plurality of nozzles 11 to discharge a liquid is formed. Specifically, on a face (hereinafter “nozzle face 12”) of the nozzle plate, the plurality of nozzles 11 is lined as a nozzle row. Each head 1 is disposed such that the nozzle row is oriented in (arrangement of the nozzles 11 matches) the direction of conveyance of the thread 101.

The fixing unit 104 (e.g., a drier) performs a fixing process (drying process) of the thread 101 to which the liquid is applied from the liquid application unit 103. The fixing unit 104 includes, for example, a heater such as an infrared irradiation device and a hot air sprayer, and heats the thread 101 to dry.

The post-treatment unit 105 includes, for example, a cleaning device that cleans the thread 101, a tension adjustment device that adjusts the tension of the thread 101, a feed amount detector that detects the amount of movement of the thread 101, and a lubricant application device that lubricates the surface of the thread 101.

The embroidery head 106 embroiders a pattern, for example, on a cloth with the thread 101.

Although the liquid discharge apparatus in the present embodiment is an embroidery machine, the present disclosure is not limited thereto. Aspects of the present disclosure are applicable to devices, such as weaving machines and sewing machines, that use linear objects such as threads. In addition, aspects of the present disclosure are applicable to apparatuses that print images on general sheet materials. Further, aspects of the present disclosure can be applied not only to apparatuses having a post-treatment device, such as an embroidery machine, but also to dyeing apparatuses and the like that dye and wind threads, etc. as described later.

Further, “thread” includes glass fiber thread, wool thread, cotton thread, synthetic thread, metal thread, wool, cotton, polymer, mixed metal thread, yarn, filament, and linear objects (continuous base materials) to which liquid is applicable. Thus, the “thread” also includes braids and flat cords (flat braids).

Figure 4:
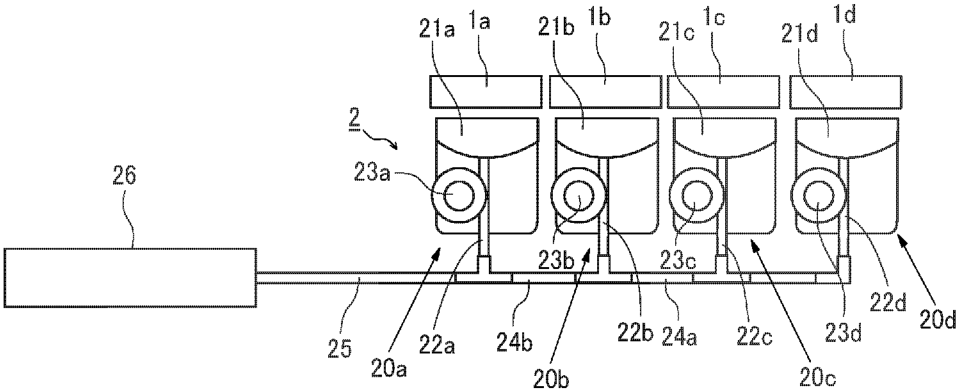
FIG. 4 is a side view illustrating a maintenance unit according to a first embodiment of the present disclosure.
Figure 7:
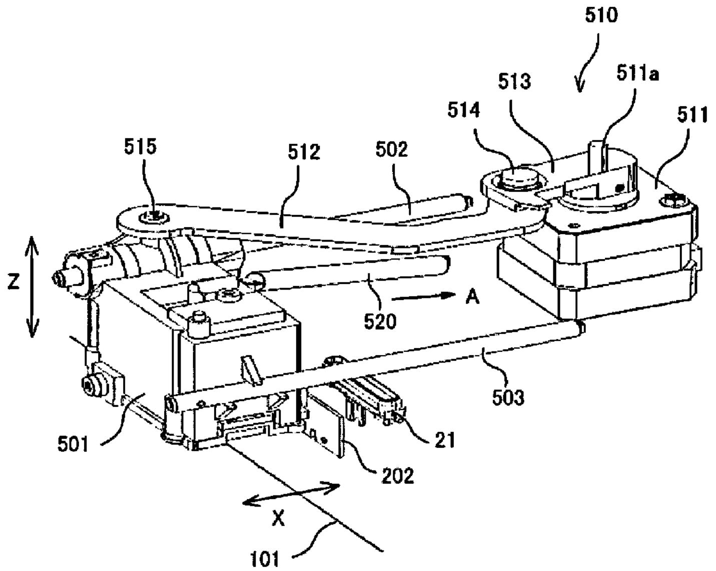
FIG. 7 is a perspective view of a portion of the liquid application unit relating to movement of one head, according to the first embodiment.

Next, a first embodiment of the present disclosure is described with reference to FIGS. 4 and 7. FIG. 4 is a view illustrating a maintenance unit according to the first embodiment.

The individual maintenance units 20 (20*a* to 20*d*) of the maintenance unit 2 respectively include a plurality of caps 21 (21*a* to 21*d*). Each of the caps 21 is disposed to contact (caps) and separate from (decaps) corresponding one of the heads 1*a* to 1*d*. To the plurality of caps 21, individual drain passages 22 (22*a* to 22*d*) are connected, respectively.

Each of the plurality of individual drain passages 22 is provided with a suction pump 23 (23*a*, 23*b*, 23*c*, or 23*d*) as a suction device, and each cap 21 is coupled to the suction pump 23 via the individual drain passage 22.

The individual drain passages 22*c* and 22*d* are connected to a common drain branch 24*a*. The common drain branch 24*a* and the individual drain passage 22*b* are connected to a common drain branch 24*b*. The common drain branch 24*b* and the individual drain passage 22*a* are connected to a common drain passage 25.

The common drain passage 25 is coupled to a waste liquid container 26 that is a waste liquid container. The waste liquid container 26 is a substantially sealed container.

The suction pump 23 is a tubing pump, and the individual drain passage 22 is a tube of the suction pump 23. The suction pump 23 performs a suction operation as follows. When a rotator rotates in a first direction, a pressure roller squeezes the tube, and the suction pump 23 sucks the inside of the cap 21. When the rotator of the suction pump 23 rotates in a second direction reverse to the first direction, the pressure roller is separated from the tube. Then, in the individual drain passage 22, a section upstream from the suction pump communicates with a section downstream from the suction pump 23.

The individual maintenance unit 20 further includes a wiper to wipe the nozzle face 12 of the corresponding head 1.

Figure 5:
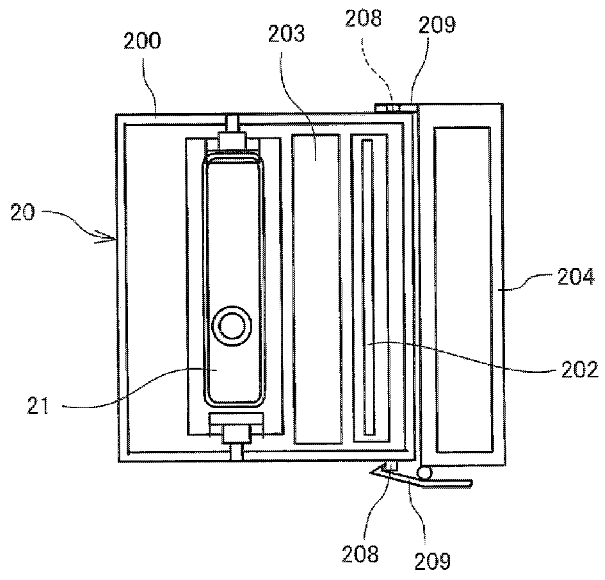
FIG. 5 is a plan view illustrating an individual maintenance unit of the maintenance unit illustrated in FIG. 4.

Referring to FIG. 5, an example of the individual maintenance unit will be described. FIG. 5 is a schematic plan view of the example of the individual maintenance unit.

The individual maintenance unit 20 illustrated in FIG. 5 includes the cap 21, a wiper 202, and a liquid receptacle 203 disposed in a housing 200. The cap 21 covers the nozzle face 12 of the head 1. The wiper 202 wipes the nozzle face 12. The liquid receptacle 203 receives the liquid discharged in dummy discharge.

Further, a liquid receptacle 204 is removably attached to the outer face of the housing 200 of the individual maintenance unit 20. For example, the liquid receptacle 204 includes engagement portions 209 to fit with bosses 208 (projections) of the housing 200, respectively, so that the liquid receptacle 204 can be attached to and detached from the housing 200.

Since the liquid receptacle 204 is removably attached to the individual maintenance unit 20, the liquid receptacle 204, not whole the individual maintenance unit 20, can be easily replaced when the liquid receptacle 204 is full.

Figure 6A:
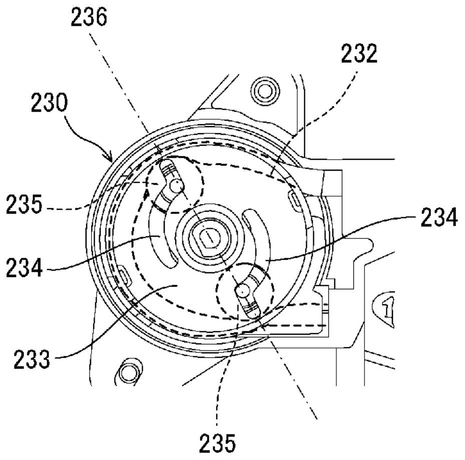
FIG. 6A is a view illustrating an example of a tubing pump serving as a suction device, according to the first embodiment.
Figure 6B:
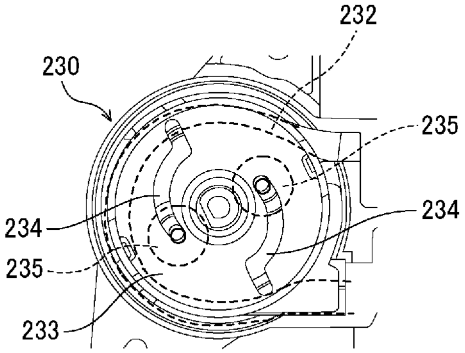
FIG. 6B is another view of the tubing pump according to the first embodiment.

Next, an example of the suction pump 23 as the suction device of the present embodiment will be described with reference to FIGS. 6A and 6B. FIGS. 6A and 6B are views illustrating a tubing pump as one example of the suction pump 23.

A tubing pump 230 illustrated in FIGS. 6A and 6B includes a rotator 233 and a plurality of pressure rollers 235 disposed on the inner peripheral side of a tube 232 (an internal flow passage or an internal tube). The rotator 233 is provided with guide grooves 234, and the pressure rollers 235 are movable along the respective guide grooves 234.

When the rotator 233 rotates in the first direction, as illustrated in FIG. 6A, the plurality of pressure rollers 235 move to the outer peripheral side of the rotator 233, thereby squeezing the tube 232. Thus, sucking is performed. Any position where the pressure roller 235 squeezes the tube 232 is defined as an open-close position 236.

Further, when the rotator 233 rotates in the second direction, as illustrated in FIG. 6B, the plurality of pressure rollers 235 move to the inner peripheral side of the rotator 233 and are separated from the tube 232, which is an idling state. Thus, the flow passage inside the tubing pump 230 (the tubing pump), formed by the tube 232, is in an open state.

Therefore, in the case where the tubing pump 230 illustrated in FIGS. 6A and 6B is used as the suction pump 23, when the pressure roller 235 is separated from the tube 232 serving as the individual drain passage 22, the tube 232 is opened. Thus, the cap 21 communicates with the common drain passage 25.

Next, an example of a structure relating to the movement of the head 1 is described with reference to FIG. 7. FIG. 7 is a perspective view of a portion of the liquid application unit 103 relating to movement of one head 1, according to the first embodiment.

The head 1 is mounted on a carriage 501 that can reciprocate in the direction indicated by arrow X, and the head 1 is moved between a home position where the head 1 is capped with the cap 21 of the individual maintenance unit 20 and a discharge position (dyeing position) where the head 1 discharges the liquid onto the thread 101.

In this embodiment, the carriage 501 is held by a main guide rod 502 and a sub-guide member 503 and reciprocally movable.

The carriage 501 is provided with a driver 510 that reciprocates the carriage 501. The driver 510 includes a motor 511 and a crank 512 that is a drive force transmission member and moved by the motor 511. These components together serve as a head driver.

A rear end (right end in FIG. 7) of the crank 512 is rotatably attached, with a shaft 514, to an arm 513 coupled to a motor shaft 511*a*. A front end (left end in FIG. 7) of the crank 512 is rotatably coupled to the carriage 501 by a support shaft 515.

A tension coil spring 520, which is an elastic member, is disposed between the carriage 501 and a fixed portion. The tension coil spring 520 pulls the carriage 501 in the direction indicated by arrow A. Arrow Z indicates the direction of height.

With this structure, as the motor 511 of the driver 510 is driven, the carriage 501 reciprocates along the main guide rod 502 and the sub-guide member 503 via the crank 512.

In order to maintain and recover the head 1, the carriage 501 is repeatedly moved between the home position opposite the cap 21 that caps the head 1 and the discharge position where the liquid is applied to the thread 101 (a medium) for dyeing (printing) and stopped at the home position and the discharge position.

Figure 8:
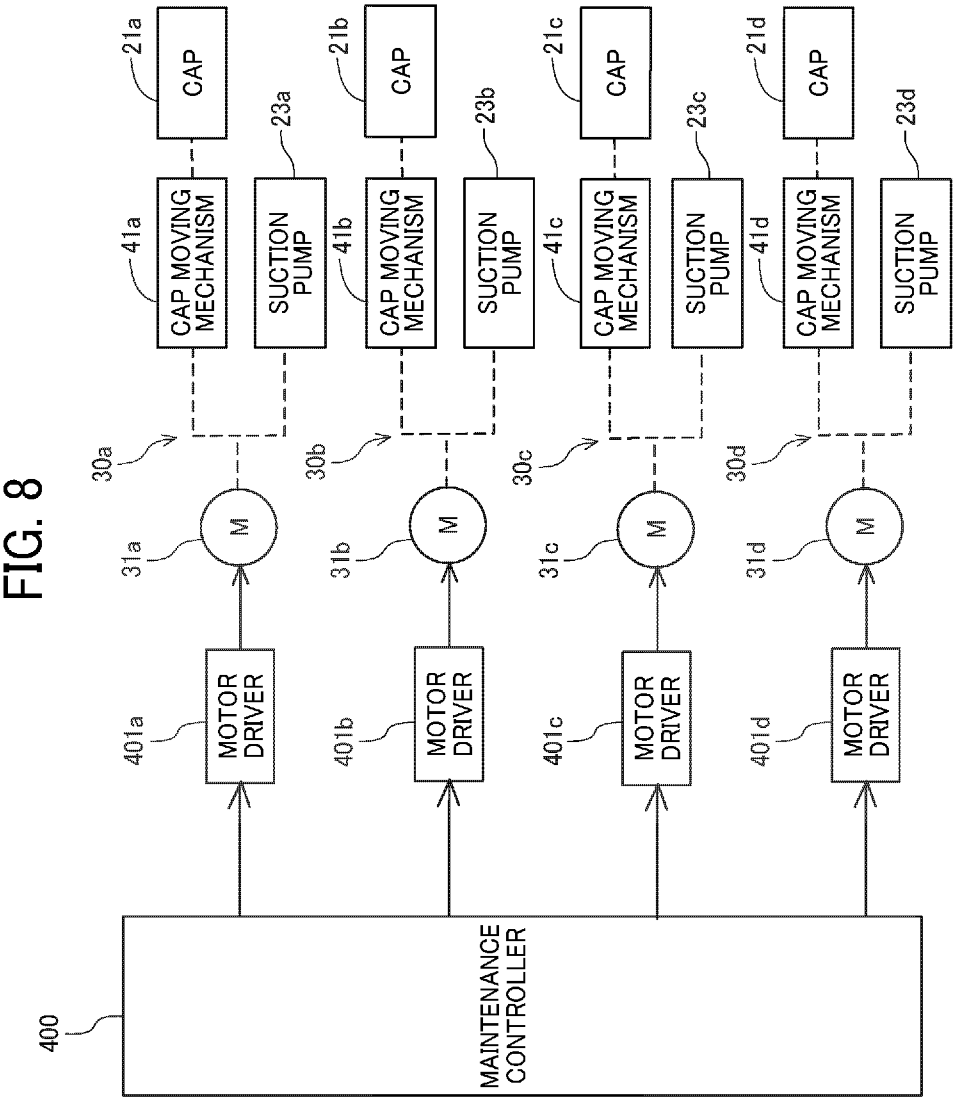
FIG. 8 is a block diagram illustrating an example of a control system of the maintenance unit.

Next, an example of a control system of the maintenance unit will be described with reference to FIG. 8. FIG. 8 is a block diagram of the control system.

The maintenance unit 2 is provided with drivers 30 (30*a* to 30*d*) including motors 31 (31*a* to 31*d*) as driving sources. The drivers 30 drive the motors 31 in forward and reverse directions, thereby driving the suction pumps 23 (23*a* to 23*d*) and cap moving mechanisms 41 (41*a* to 41*d*) that move the caps 21 (21*a* to 21*d*) to and from (up and down) the respective heads 1.

A maintenance controller 400 controls, via motor drivers 401 (401*a* to 401*d*), the respective motors 31 (31*a* to 31*d*) of the drivers 30, thereby controlling advancing and retreating of the cap moving mechanisms 41 (to put and separate the cap 21 on and from the head 1) and the suction operation by the suction pumps 23. For example, the maintenance controller 400 has a configuration similar to that of a general-purpose computer.

When performing the advancing and retreating of the cap 21 (capping and decapping of the head 1), the maintenance controller 400 separates the pressure rollers 235 of the suction pump 23 (the tubing pump) from the tube 232 to open the internal flow passage, to allow communication between the cap 21 and the common drain passage 25.

In addition, before performing the suction operation by the tubing pump being the suction pump 23 (the suction device), the maintenance controller 400 causes the pressure rollers 235 of the suction pump 23 to press the tubes 232 (serving as the individual drain passages 22) that communicates with each other in the common drain passage 25. In this state, the individual drain passages 22 are closed, and the caps 21 are shut off from the common drain passage 25.

Next, an example of control by the maintenance controller will be described with reference to the flowchart in FIG. 9.

In the state where the liquid discharge apparatus 100 is powered off or in a standby state, the cap 21 is put on the head 1, that is, caps the head 1. From this state, when the power is turned on or when the printing operation and the head maintenance operation are performed, the cap 21 is separated from the head 1 (decapping).

In separating the cap 21, the maintenance controller 400 controls the suction pump 23 to open the passage therein, so that the individual drain passage 22 communicates with the waste liquid container 26. This operation can suppress fluctuations in pressure when the cap 21 is separated from the head 1, thereby reducing influences on the nozzle meniscus of the head 1.

Thereafter, when the individual drain passage 22 is closed due to an initial operation at power on, a maintenance operation, or other factors, the individual drain passage 22 is opened again before the cap 21 again contacts the head 1 (capping). This operation can suppress fluctuations in pressure when the cap 21 is put on the head 1, thereby reducing influences on the nozzle meniscus of the head 1.

To select one or more heads 1 of the plurality of heads 1 and perform the maintenance operation (suction operation), the individual drain passage 22 communicating with the cap 21 corresponding to the head 1 that is not the maintenance target (a sucking target) is closed before the maintenance operation (suction operation) is performed.

This operation can prevent the waste liquid, which is sucked and discharged from the head 1 being the maintenance target, from flowing into the caps 21 of the heads 1 that are not the maintenance target through the common drain branches 24 (24*a* and 24*b*) and the individual drain passages 22.

Further, in the case where the cap 21 remains on the head 1 that is not the maintenance target, one end of the section from the open-close position 236 (for opening the passage) to the head 1 is closed. Accordingly, this section becomes a closed section upon the closing operation of the passage. Furthermore, since some volume fluctuations are inherent to the passage opening or closing operation, the pressure fluctuates in the closed section from the open-close position 236 (for opening the passage) to the head 1. Thus, there is a risk that the meniscus of the head 1 is damaged and discharge defect occurs. Therefore, before closing the passage leading to the cap 21 corresponding to the head 1 that is not the maintenance target, the cap 21 is separated from the head 1.

Figure 9:
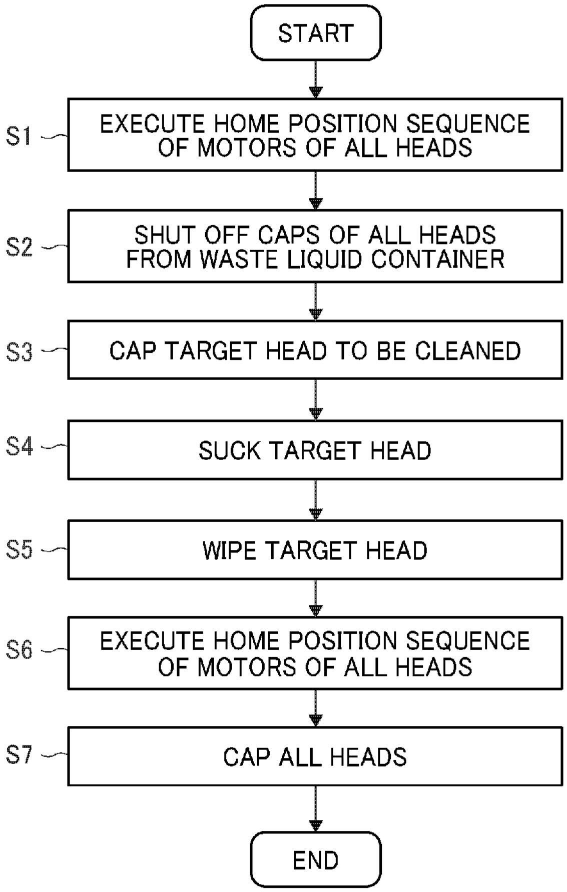
FIG. 9 is a flowchart illustrating an example of control by a maintenance controller according to an embodiment.

Referring to FIG. 9, when starting cleaning (the maintenance operation), the maintenance controller 400 executes the home position sequence of the motors 31 (maintenance motors) of all the individual maintenance units 20 (step S1, hereinafter referred to as "S1"). The home position is a position where the cap 21 is separated from the head 1.

Thereafter, the individual drain passages 22 of all the caps 21 are closed, thereby shutting off the caps 21 from the waste liquid container 26 communicating therewith through the common drain passage 25 (S2).

Next, the head 1 to be cleaned, that is, the target head to be sucked, is capped with the cap 21 (S3). Then, the suction pump 23 is driven to suck and discharge the liquid from the nozzle 11 of the head 1 into the cap 21 (S4). The amount of the liquid sucked is predetermined for cleaning.

At this time, the individual drain passage 22 of the cap 21 of the head 1 that is not the suction target is closed. Accordingly, the waste liquid that is sucked from the head 1 (the suction target) and discharged through the individual drain passage 22 does not flow into the cap 21 of the head 1 that is not the target.

Thereafter, the suction target head 1 is wiped (S5). When the suction operation of the suction target head 1 is completed, the maintenance controller 400 executes the home position sequence of the motors 31 (maintenance motors) of all the individual maintenance units 20 (S6). Then, all the individual drain passages 22 are opened.

Then, all the heads 1 are capped with the respective caps 21 (S7), and the cleaning is finished.

As described above, according to the present embodiment, when the caps are put on or separated from a plurality of heads, the meniscuses are protected from the influence of pressure fluctuations, and a reliable recovery operation is performed on the maintenance targets regardless of the number of selected heads. Simultaneously, the head that is not the maintenance target is protected from the effect of the suction operation performed on the maintenance target head.

Thus, in the structure in which a plurality of heads are provided with respective caps and respective suction devices, the structure can be simplified when the respective individual drain passages leading to the suction devices are connected to the common drain passage to be connected to one waste liquid container.

Additionally, although the plurality of individual drain passages communicate with each other via the common drain passage, the above-described structure can prevent the waste liquid sucked from a specific cap (head) from flowing into other caps, thereby performing a reliable maintenance operation.

Figure 10:
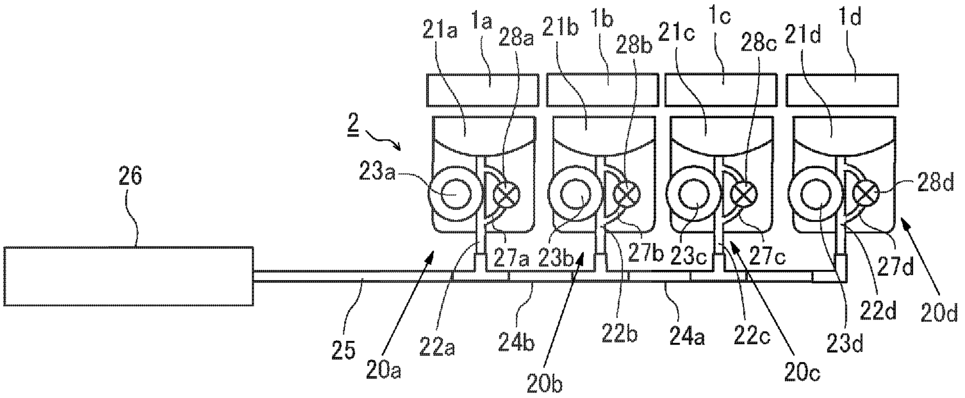
FIG. 10 is a view of a maintenance unit according to a second embodiment of the present disclosure.

Next, a second embodiment of the present disclosure is described with reference to FIG. 10. FIG. 10 is a view illustrating a maintenance unit according to the first embodiment.

In the present embodiment, the suction pump 23 is a pump, such as a diaphragm pump or a single-function tubing pump (tube pump), that shuts off the internal flow passage when the suction operation is not performed.

Therefore, the maintenance unit 2 includes bypass passages (detour passage) 27 (27*a* to 27*d*) that bypass the suction pumps 23 (connects the passage upstream from the suction pump 23 with the passage downstream therefrom) and communicates with the individual drain passages 22, respectively. The bypass passages 27 are provided with an open-close member 28 (28*a* to 28*d*), such as shutters or valves, to open and close the bypass passages 27. For example, the maintenance controller 400 described in the first embodiment controls opening and closing of the open-close member 28.

Figure 11:
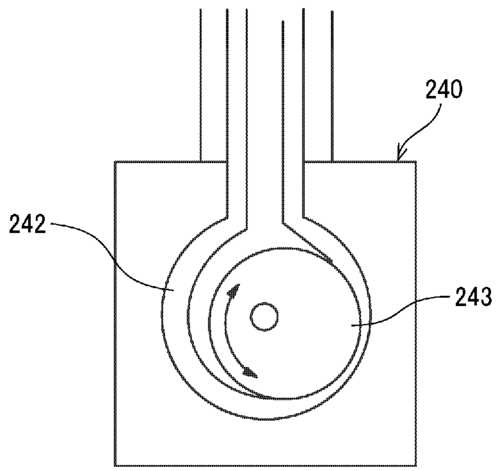
FIG. 11 is a view illustrating an example of a tubing pump serving as the suction pump of the second embodiment.

Next, another example of the tubing pump serving as the suction pump of the present embodiment is described with reference to FIG. 11. FIG. 11 is a view illustrating another example of the tubing pump.

A tubing pump 240 illustrated in FIG. 11 includes an eccentric pressure roller 243 that rotates in the directions indicated by the arrow in FIG. 11. As the pressure roller 243 squeezes a tube 242, the fluid in the tube 242 can be moved.

In the tubing pump 240, the tube 242 is squeezed by the pressure roller 243 when the pressure roller 243 rotates in either direction. Accordingly, the internal flow passage is closed when the tubing pump 240 is not operating (not sucking).

Therefore, when the tubing pump 240 is used as the suction pump 23, stopping of the tubing pump 240 does not result in opening of the individual drain passage 22 formed by the tube 242, and the cap 21 does not communicate with the common drain passage 25.

Therefore, in the present embodiment, as described above, when the cap 21 is put on or separated from the head 1, the open-close member 28 is opened to open the bypass passages 27, thereby causing the upstream side of the individual drain passage 22 from the suction pump 23 to communicate with the downstream side of the individual drain passage 22. Then, the passage from the cap 21 to the common drain passage 25 is continuous.

This operation can inhibit the pressure fluctuations when the cap 21 is put on or separated from the head 1 and suppress the influence on the nozzle meniscus of the head 1.

On the other hand, in the present embodiment, the flow passage inside the tubing pump 240 is closed when the tubing pump 240 is not operating (stop state). Accordingly, to shut off the cap 21 from the common drain passage 25, the open-close member 28 is closed, thereby closing the bypass passage 27. In other words, the open-close member 28 and the maintenance controller 400 to control the closing of the open-close member 28 close the individual drain passage 22 before the suction operation performed by the tubing pump 240.

With this configuration, although the plurality of individual drain passages communicate with each other via the common drain passage, the waste liquid sucked from a specific cap (head) can be prevented from flowing into other caps, and a reliable maintenance operation can be performed.

Figure 12:
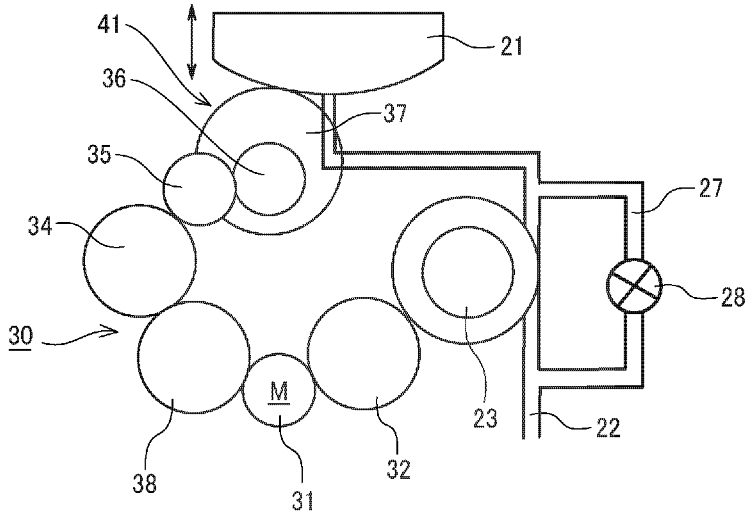
FIG. 12 is a view of a driver of the maintenance unit according to a third embodiment of the present disclosure.

Next, a third embodiment of the present disclosure is described with reference to FIG. 12. FIG. 12 is a view illustrating a driver of the maintenance unit according to the third embodiment.

The driver 30 illustrated in FIG. 12 transmits the rotation of the motor 31 (drive motor) that is a driving source to the drive shaft of the suction pump 23 via a gear 32. Further, the driver 30 transmits the rotation of the motor 31 to a gear 34 via a one-way clutch 38, and transmits the rotation from the gear 34, via gears 35 and 36, to an eccentric cam 37. The eccentric cam 37 serves as the cap moving mechanism 41 to move the cap 21 back and forth (up and down).

The individual drain passage 22 includes the bypass passage 27 that bypasses the suction pump 23, and the bypass passage 27 is provided with the open-close member 28 that opens and closes the bypass passage 27. The bypass passage 27 is opened and closed as necessary.

When the suction pump 23 is rotated in the first direction by the motor 31 to function as a pump, the bypass passage 27 is closed with the open-close member 28, to enable the suction by the suction pump 23.

At this time, since the transmission of rotation from the motor 31 to the eccentric cam 37 is interrupted by the one-way clutch 38, the cap 21 does not move up or down (advance or retreat).

When the suction pump 23 is rotated in the second direction, the rotation of the motor 31 is transmitted to the eccentric cam 37 by the one-way clutch 38, and the cap 21 moves up or down.

At this time, the suction pump 23 is reversed, and an operation other than the required operation is performed in some cases. For example, when the suction pump 23 is a diaphragm pump, the direction of liquid feeding is to be fed is the same regardless of the rotation direction of the suction pump 23. By contrast, when the suction pump 23 is a single-function tubing pump 240, the direction of liquid feeding is reversed.

Therefore, opening the open-close member 28 and thereby opening the bypass passage 27 can prevent fluctuations in the pressure in the individual drain passage 22. Only moving up or down of the cap 21 occurs.

Thus, according to the present embodiment, one driving source has a plurality of functions. That is, the driving source of the suction pump is capable of forward drive and reverse drive. The suction operation can be performed by rotation in the first direction, and contact and separating between the cap and the head can be performed by rotation in the second direction. This configuration can reduce the weight and the size of the apparatus.

Figure 13:
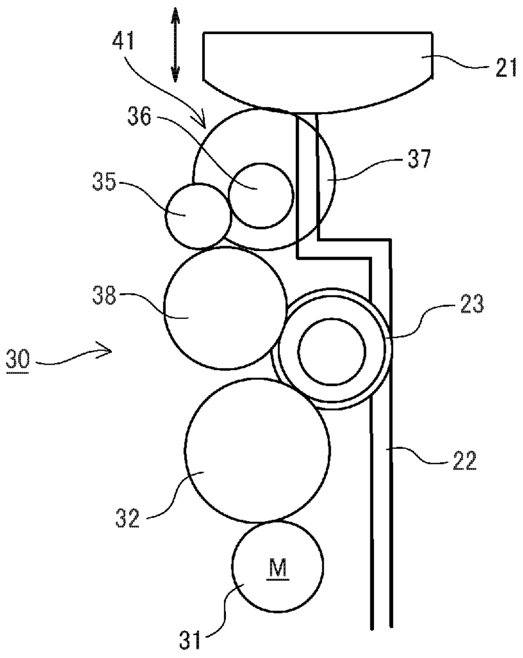
FIG. 13 is a view illustrating a driver of the maintenance unit according to a fourth embodiment of the present disclosure.

Next, a fourth embodiment of the present disclosure is described with reference to FIG. 13. FIG. 13 is a view illustrating a driver of the maintenance unit according to the fourth embodiment.

In the present embodiment, the suction pump 23 is a tubing pump as described above. The suction occurs in rotation in the first direction, and the tube 232 is opened in rotation in the second direction.

The driver 30 transmits the rotation of the motor 31 to the drive shaft of the suction pump 23 via the gear 32, and transmits the rotation of the suction pump 23 to the gear 35 via the one-way clutch 38. Further, the driver 30 transmits the rotation from the gear 35, via the gear 36, to the eccentric cam 37 serving as the cap moving mechanism 41 illustrated in FIG. 8.

With this structure, when the motor 31 drives in the forward direction and the suction pump 23 is rotated in the first direction, the connection of the one-way clutch 38 is released, and the pressure roller 235 presses the tube 232 (see FIG. 6A) to function as a pump. Thus, only the suction operation can be performed.

On the other hand, when the motor 31 drives in the reverse direction and the suction pump 23 is rotated in the second direction, the one-way clutch 38 is engaged. Before the cap 21 starts moving up or down, the pressing of the tube 232 by the pressure roller 235 is released. Then, flow throughout the tube 232 is enabled. Accordingly, in a state where the individual drain passage 22 is opened and the cap 21 and the common drain passage 25 (the waste liquid container 26) communicate with each other, the contact or separation operation of the cap 21 is started.

This configuration eliminates the need for the bypass passage 27 and the open-close member 28 for bypassing the suction pump 23 as in the third embodiment. Further, switching between the continuous state and discontinuous state (opening/closing) of the individual drain passage 22 is automatically performed before and after the cap 21 is moved forward or backward. Accordingly, timing of the opening and closing of the individual drain passage 22 can reliably correspond with timing of the advancing and retracting of the cap 21.

Thus, the passages from the cap to the waste liquid container are coupled to each other using, as the suction pump, a tubing pump that performs sucking when rotating in the first direction and opens the internal flow passage when rotating in the second direction. This configuration can block or make the passages continuous, without touching the liquid and with the components constructing the passages from the cap to the waste liquid container kept connected.

By rotating the suction pump in the first direction for pumping, the tube can be automatically closed and the suction operation can be performed. By rotating the suction pump in the second direction, the pressing of the tube is automatically released, and flow is allowed in the tube. Therefore, a mechanism for the shutoff and allowing flow in the tube is integrated with the suction pump, so that shutoff and allowing flow in the individual drain passage can be reliably performed at a desired timing.

Figure 14:
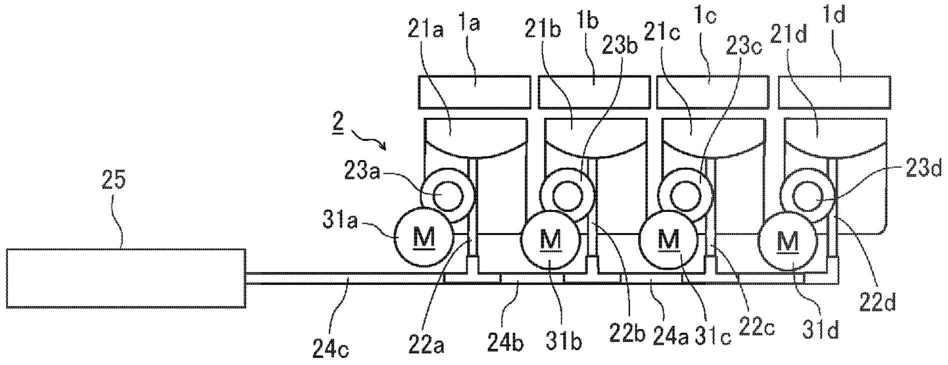
FIG. 14 is a view illustrating a maintenance unit according to a fifth embodiment of the present disclosure.

Next, a fifth embodiment of the present disclosure is described with reference to FIG. 14. FIG. 14 is a view illustrating a maintenance unit according to the fifth embodiment.

In the present embodiment, each suction pump 23 is provided with one motor 31 (one of motors 31*a* to 31*d*) as a driving source.

By providing each suction pump 23 with one driving source, the configuration of the driver 30 for each suction pump 23 is simplified, and the number of parts is reduced. Accordingly, the reliability of the operation is improved. Further, since the operation or maintenance of the plurality of heads 1 can be performed simultaneously regardless of the number of the heads 1 selected, selecting of the head 1 is unnecessary, and the operation time required for the maintenance can be shortened. Furthermore, since the operation load on each motor is only the suction pump 23 and the driver 30 of one head 1, the torque required for one driving source can be reduced, and the apparatus can be downsized.

Figure 15:
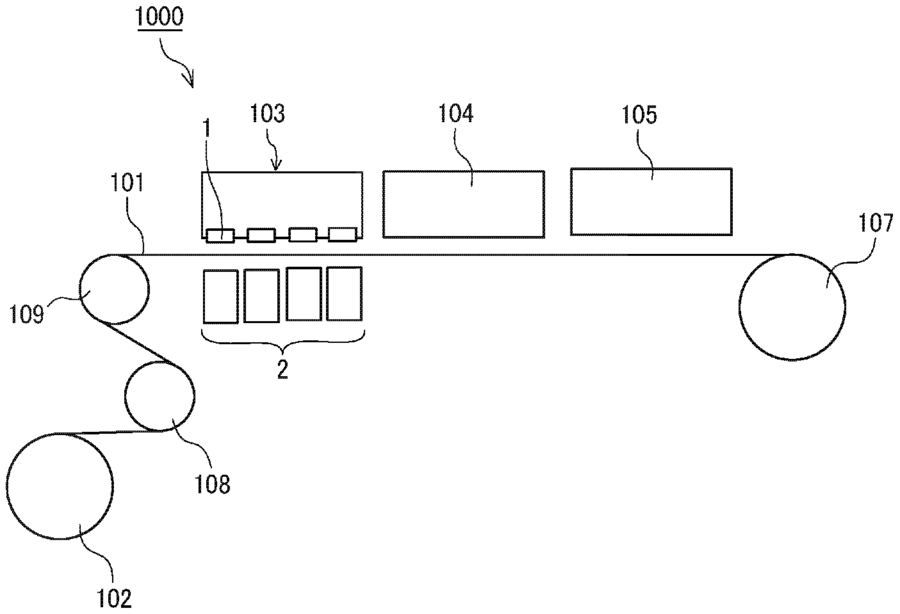
FIG. 15 is a schematic view of a dyeing apparatus according to an embodiment of the present disclosure.

A description is given below of a dyeing apparatus according to an embodiment of the present disclosure, with reference to FIG. 15. FIG. 15 is a schematic view of the dyeing apparatus.

In a dyeing apparatus 1000, the embroidery head 106 in the liquid discharge apparatus 100 is replaced with a take-up reel 107 (a winder) to wind the thread 101 after dyeing.

The dyeing apparatus 1000 supplies the thread 101 from the supply reel 102, discharges a liquid of a required color from the liquid application unit 103, dyes the thread 101 into a target color, and winds the dyed thread 101 with the take-up reel 107.

In the present disclosure, "liquid" discharged from a liquid discharge head is not particularly limited as long as the liquid has a viscosity and surface tension of degrees dischargeable from the liquid discharge head. Examples of the liquid include a solution, a suspension, or an emulsion including, for example, a solvent, such as water or an organic solvent, a colorant, such as dye or pigment, a functional material, such as a polymerizable compound, a resin, a surfactant, a biocompatible material, such as DNA, amino acid, protein, or calcium, and an edible material, such as a natural colorant. Such a solution, a suspension, or an emulsion can be used for, e.g., inkjet ink, surface treatment liquid, a liquid for forming components of electronic element or light-emitting element or a resist pattern of electronic circuit, or a material solution for three-dimensional fabrication.

Examples of an energy source for generating energy to discharge liquid include a piezoelectric actuator (a laminated piezoelectric element or a thin-film piezoelectric element), a thermal actuator that employs an electrothermal transducer element, such as a heat element, and an electrostatic actuator including a diaphragm and opposed electrodes.

Examples of the liquid discharge apparatus include, not only apparatuses capable of discharging liquid to materials to which liquid can adhere, but also apparatuses to discharge a liquid toward gas or into a liquid.

The liquid discharge apparatus may include at least one of devices for feeding, conveying, and ejecting a material to which liquid can adhere. The liquid discharge apparatus may further include at least one of a pretreatment apparatus and a post-treatment apparatus.

As the liquid discharge apparatuses, for example, there are image forming apparatuses to discharge ink onto sheets to form images and three-dimensional fabricating apparatuses to discharge molding liquid to a powder layer in which powder is molded into a layer-like shape, so as to form three-dimensional fabricated objects.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-mentioned term "material to which liquid can adhere" represents a material which liquid can, at least temporarily, adhere to and solidify thereon, or a material into which liquid permeates. Examples of "material to which liquid can adhere" include paper sheets, recording media such as recording sheet, recording sheets, film, and cloth; electronic components such as electronic substrates and piezoelectric elements; and media such as powder layers, organ models, and testing cells. The term "material to which liquid can adhere" includes any material to which liquid adheres, unless particularly limited.

The above-mentioned "material to which liquid adheres" may be any material, such as paper, thread, fiber, cloth, leather, metal, plastic, glass, wood, ceramics, or the like, as long as liquid can temporarily adhere.

The "liquid discharge apparatus" may be an apparatus in which the liquid discharge head and a material to which liquid can adhere move relatively to each other. However, the liquid discharge apparatus is not limited to such an apparatus. For example, the liquid discharge apparatus can be either an apparatus that moves the liquid discharge head or an apparatus that does not move the liquid discharge head.

Examples of the "liquid discharge apparatus" further include a treatment liquid coating apparatus to discharge a treatment liquid to a sheet to coat the treatment liquid on a sheet surface to reform the sheet surface and an injection granulation apparatus in which a composition liquid including raw materials dispersed in a solution is discharged through nozzles to granulate fine particles of the raw materials.

The terms "image formation", "recording", "printing", "image printing", and "fabricating" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

This patent application is based on and claims priority pursuant to 35 U.S.C. § 119(a) to Japanese Patent Application Nos. 2018-248020, filed on Dec. 28, 2018, and 2019-193131, filed on Oct. 24, 2019, in the Japan Patent Office, the entire disclosure of which is hereby incorporated by reference herein.

REFERENCE SIGNS LIST

1 (1*a*-1*d*) Head
2 Maintenance unit
20 (20*a* to 20*d*) Individual maintenance unit
21 (21*a* to 21*d*) Cap
22 (22*a* to 22*d*) Individual drain passage
23 (23*a* to 23*d*) Suction pump
24*a*, 24*b* Common drain branch
25 Common drain passage
26 Waste liquid container
30 (30*a* to 30*d*) Driver
31 (31*a* to 31*d*) Drive motor
100 Liquid discharge Apparatus
101 Thread
103 Liquid application unit
400 Maintenance controller
1000 Dyeing apparatus

The invention claimed is:

1. A liquid discharge apparatus comprising:
a plurality of heads to discharge a liquid;
a plurality of caps to contact and move away from the plurality of heads, respectively;
a plurality of individual drain passages to communicate with the plurality of caps, respectively;
at least one common drain passage to communicate with at least two of the plurality of individual drain passages;
a plurality of suction generators in the plurality of individual drain passages, respectively; and
control circuitry,
wherein each of the plurality of individual drain passages is configured to allow and shut off communication between a cap among the plurality of caps and the at least one common drain passage, and
wherein the control circuitry is configured to:
cause each of the plurality of individual drain passages to allow the communication between the cap and the at least one common drain passage when performing decapping of the head;
cap a head that is a sucking target among the plurality of heads with the cap after shutting off each individual drain passage communicating with the cap corresponding to a head that is not the sucking target among the plurality of heads; and
control a corresponding suction generator among the plurality of suction generators to perform suction of the head that is the sucking target.

2. The liquid discharge apparatus according to claim 1, wherein each of the plurality of individual drain passages is shut off after the cap is separated from the head.

3. The liquid discharge apparatus according to claim 1, wherein each of the plurality of suction generators includes a pump configured to open an internal flow passage when not performing suction.

4. The liquid discharge apparatus according to claim 3, wherein each of the plurality of suction generators includes a tubing pump configured to:
press an internal tube serving as the individual drain passage to perform suction when rotating in a first direction; and
release pressing of the individual drain passage to open the individual drain passage when rotating in a second direction opposite the first direction.

5. The liquid discharge apparatus according to claim 1, wherein each of the plurality of suction generators includes a pump configured to shut off an internal flow passage when not performing suction, and
wherein each of the plurality of individual drain passages includes:
a bypass passage configured to bypass the suction generator; and
a closing structure configured to selectively close the bypass passage.

6. The liquid discharge apparatus according to claim 1, further comprising:
a driver including a driving source configured to drive in a forward direction and a reverse direction;
the driver is configured to:
drive each of the plurality of suction generators by a forward drive of the driving source; and
cap the head or decap the head by a reverse drive of the driving source.

7. The liquid discharge apparatus according to claim 1, wherein each of the plurality of suction generators includes a driving source.

8. The liquid discharge apparatus according to claim 1, further comprising:
a head driver configured to move each of the plurality of heads between a position at which the liquid is discharged to a liquid application target and a position at which the head opposes corresponding one of the plurality of caps.

9. An embroidery machine comprising:
a plurality of heads to discharge a liquid onto a medium;
a conveyor to convey the medium
a drier to dry the medium to which the liquid is applied;
a post-treatment section to perform a post-treatment of the medium to which the liquid is applied;
an embroiderer to perform embroidery with the medium treated by the post-treatment section;
a plurality of caps to contact and move away from the plurality of heads, respectively;
a plurality of individual drain passages communicating with the plurality of caps, respectively;
at least one common drain passage communicating with at least two of the plurality of individual drain passages;
a plurality of suction generators in the plurality of individual drain passages, respectively; and
control circuitry,
wherein each of the plurality of individual drain passages is configured to allow and shut off communication between a cap among the plurality of caps and the at least one common drain passage, and
wherein the control circuitry is configured to:
cause each of the plurality of individual drain passages to allow the communication between the cap and the at least one common drain passage when performing decapping of the head;
cap a head that is a sucking target among the plurality of heads with the cap after shutting off each individual drain passage communicating with the cap corresponding to a head that is not the sucking target among the plurality of heads; and control a corresponding suction generator among the plurality of suction generators to perform suction of the head that is the sucking target.

10. A maintenance device comprising:

a plurality of caps to contact and move away from a plurality of heads, respectively;

a plurality of individual drain passages communicating with the plurality of caps, respectively;

at least one common drain passage communicating with at least two of the plurality of individual drain passages;

a plurality of suction generators in the plurality of individual drain passages, respectively; and control circuitry, wherein each of the plurality of individual drain passages is configured to allow and shut off communication between a cap among the plurality of caps and the at least one common drain passage, and wherein the control circuitry is configured to:

cause each of the plurality of individual drain passages to allow the communication between the cap and the at least one common drain passage when performing decapping of the head; and cap a head that is a sucking target among the plurality of heads with the cap after shutting off each individual drain passage communicating with the cap corresponding to a head that is not the sucking target among the plurality of heads; and control a corresponding suction generator among the plurality of suction generators to perform suction of the head that is the sucking target.

* * * * *